United States Patent [19]
Sturt et al.

[11] Patent Number: 6,145,911
[45] Date of Patent: Nov. 14, 2000

[54] VEHICLE TRACK COVER SYSTEM

[75] Inventors: Alan Sturt, West Bloomfield; Iris Drew, Berkley, both of Mich.

[73] Assignee: Lear Corporation, Southfield, Mich.

[21] Appl. No.: 09/497,035

[22] Filed: Feb. 2, 2000

[51] Int. Cl.[7] .................................................... B60N 2/02
[52] U.S. Cl. ................................ 296/65.01; 296/65.13
[58] Field of Search .............................. 296/65.01, 65.13

[56] References Cited

U.S. PATENT DOCUMENTS

| | | |
|---|---|---|
| 3,817,015 | 6/1974 | Frangos . |
| 3,866,267 | 2/1975 | Poletti . |
| 4,382,986 | 5/1983 | Reuben . |
| 4,581,269 | 4/1986 | Tilman . |
| 4,671,981 | 6/1987 | McLaughlin . |
| 4,716,065 | 12/1987 | McLaughlin . |
| 4,741,065 | 5/1988 | Parkins . |
| 4,810,546 | 3/1989 | McLaughlin . |
| 4,998,319 | 3/1991 | Ford . |
| 5,007,143 | 4/1991 | Herrington . |
| 5,021,277 | 6/1991 | Fan . |
| 5,228,659 | 7/1993 | Potes, Jr. et al. . |

*Primary Examiner*—Gary C. Hoge
*Attorney, Agent, or Firm*—Brooks & Kushman P.C.

[57] ABSTRACT

A track cover system for use with a vehicle having a track includes first and second cover elements adapted to be attached to the vehicle such that the cover elements are disposed on opposite sides of the track. Furthermore, the cover elements are engageable with each other. The track cover system also includes a slider that is slidably engageable with the cover elements for engaging the cover elements together to thereby cover at least a portion of the track. The track cover system of the invention therefore inhibits dust, dirt, moisture and/or other debris from collecting in the track.

18 Claims, 4 Drawing Sheets

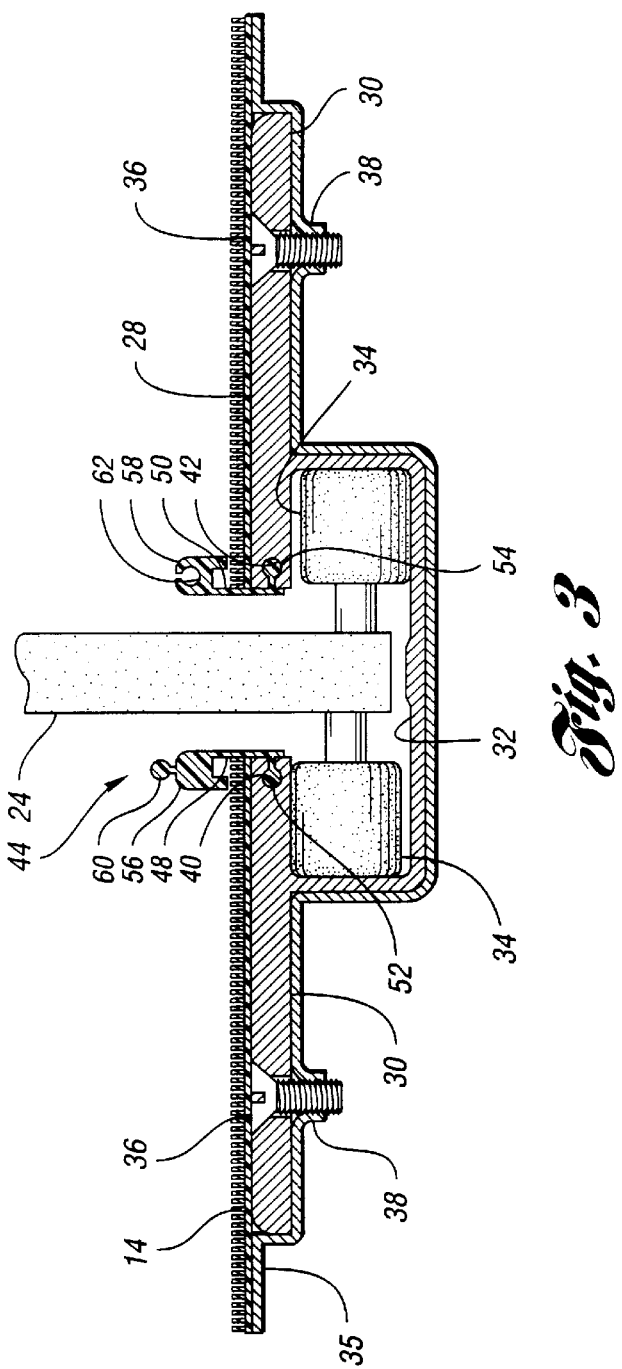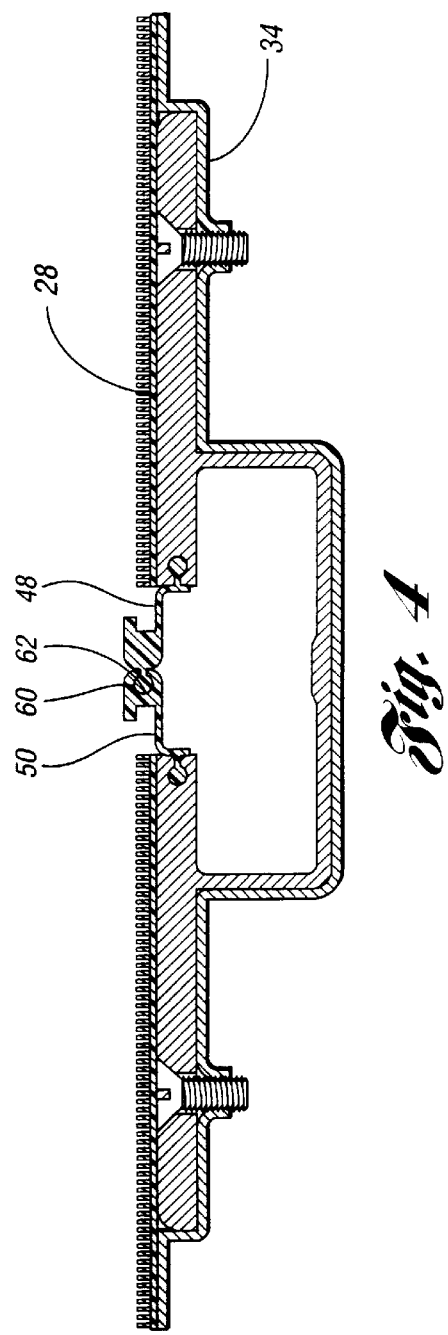

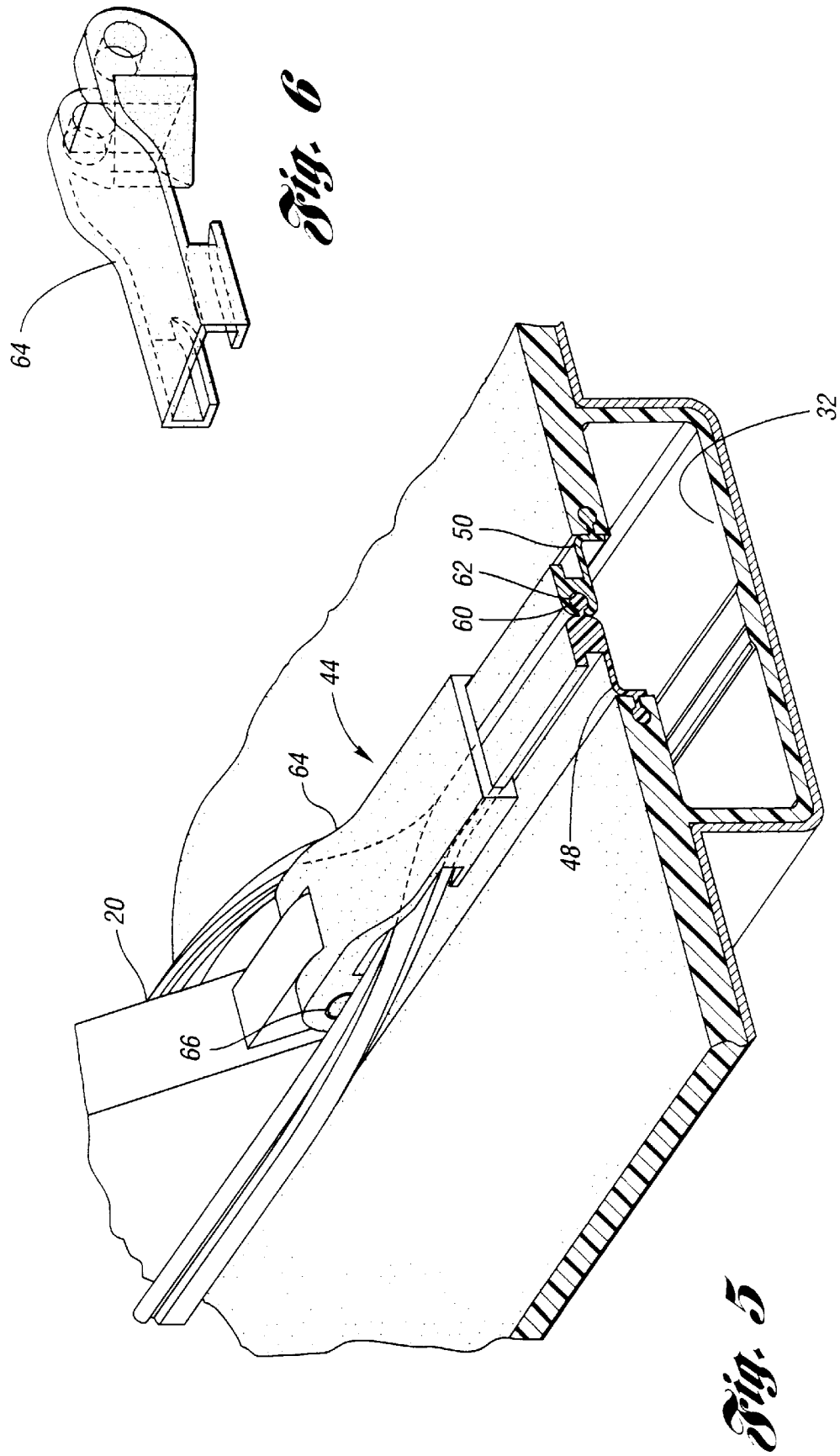

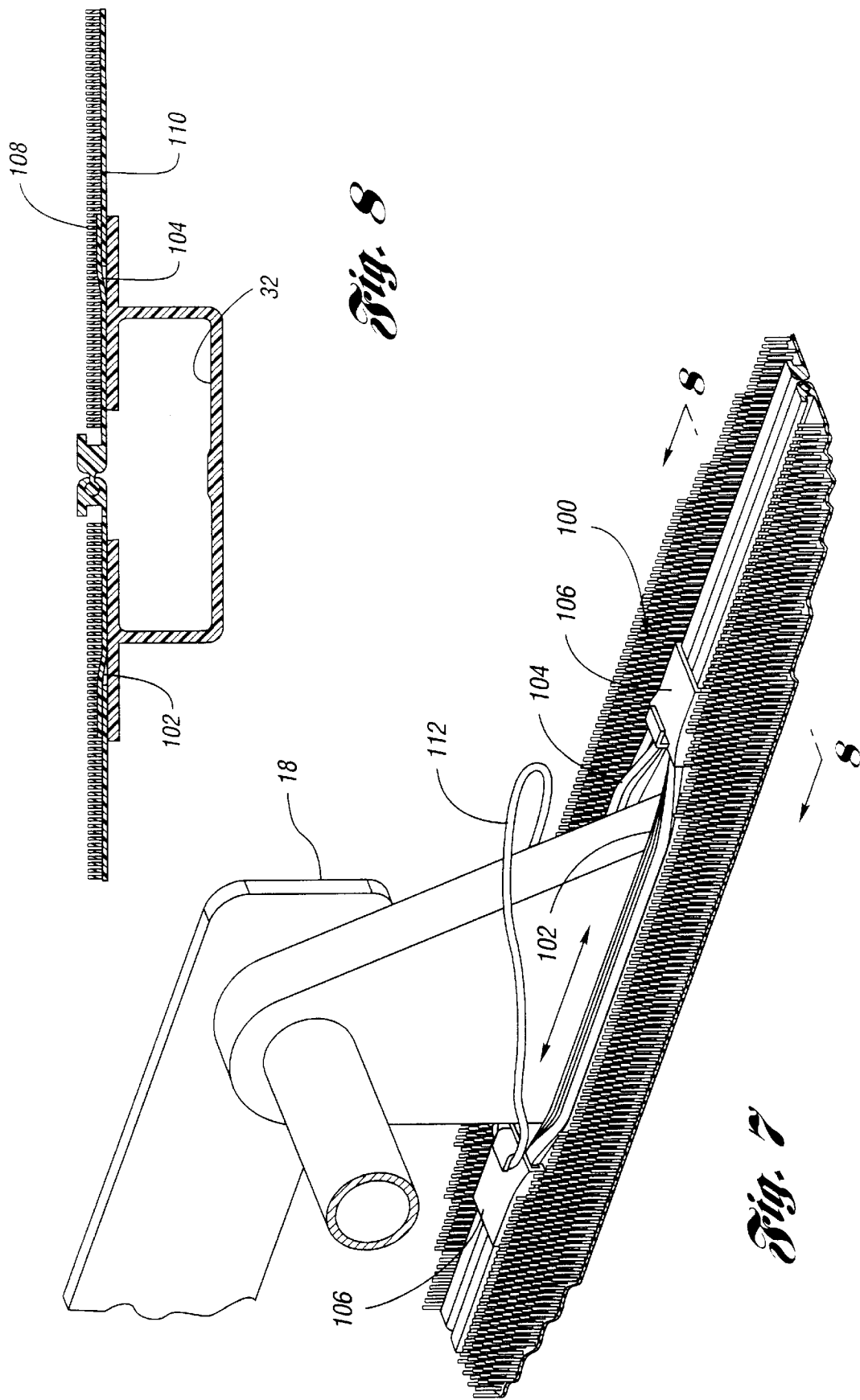

VEHICLE TRACK COVER SYSTEM

TECHNICAL FIELD

The invention relates to a track cover system for use with a vehicle having a track.

BACKGROUND ART

Many vehicles are provided with tracks having track slots for receiving moveable elements. For example, some minivans are provided with tracks along the passenger side and/or driver side for receiving sliding posts of sliding door assemblies. As another example, some vehicles are provided with tracks for receiving wheels of moveable seat assemblies. Because the track slots of such tracks are open, however, the track slots frequently collect dust, dirt, moisture and other debris.

DISCLOSURE OF INVENTION

Under the invention, a track cover system for use with a vehicle having a track includes first and second cover elements adapted to be attached to the vehicle such that the cover elements are disposed on opposite sides of the track. Furthermore, the cover elements are engageable with each other. The track cover system also includes a slider that is slidably engageable with the cover elements for engaging the cover elements together to thereby cover at least a portion of the track. The track cover system of the invention therefore inhibits dust, dirt, moisture and/or other debris from collecting in the track.

The cover elements may be adapted to be attached to the track, to a flooring system of the vehicle, or to some other element or component of the vehicle. Furthermore, one cover element may be provided with a bead, and the other cover element may be provided with a socket for receiving the bead.

According to a feature of the invention, the slider may be adapted to cooperate with a moveable element received in the track so that the slider can move with the moveable element. For example, the slider may be adapted to be attached to a leg of a moveable vehicle seat.

Further under the invention, a seating system for use with a vehicle includes first and second tracks adapted to be attached to the vehicle. Each of the tracks includes a track body having a track slot, and first and second cover elements attached on opposite sides of the track body. Furthermore, the cover elements of each track are engageable with each other. The seating system also includes a seat having first and second legs that are moveable along the first and second tracks, respectively. In addition, first and second sliders are disposed proximate the first and second legs, respectively, and are slidably engageable with the cover elements of the first and second tracks, respectively. Movement of the sliders in a first direction causes the cover elements of each track to engage each other and thereby cover a portion of each track slot, and movement of the sliders in a second direction opposite the first direction causes the cover elements of each track to disengage and thereby uncover the portion of each track slot.

According to a feature of the invention, one track body may be provided with one of the group consisting of a bead and a socket, and one cover element may be provided with the other of the group consisting of the bead and the socket for attaching the one cover element to the one track body. Preferably, each cover element has a bead, and each track body has first and second sockets, wherein each of the sockets is configured to receive a respective bead.

Preferably, the first and second sliders are disposed in front of the first and second legs, respectively, and are attached to the first and second legs, respectively. Furthermore, the seating system may also comprise third and fourth sliders disposed behind the first and second legs, respectively, and slidably engageable with the cover elements of the first and second tracks, respectively. Moreover, movement of the third and fourth sliders in the first direction causes the over elements of each track to disengage, and movement of the third and fourth sliders in the second direction causes the cover elements of each track to engage each other.

These and other objects, features and advantages of the invention are readily apparent from the following detailed description of the best modes for carrying out the invention when taken in conjunction with the accompanying drawings.

BRIEF DESCRIPTION OF DRAWINGS

FIG. 3 is a cross-sectional view of the seating system taken along line 3—3 of FIG. 2;

FIG. 4 is a cross-sectional view of the first track and the first track cover system taken along line 4—4 of FIG. 2;

FIG. 5 is a perspective view of the first track and first track cover system;

FIG. 6 is a perspective view of a slider of the first track cover system;

FIG. 7 is a perspective view of a second embodiment of the first track cover system; and FIG. 8 is a cross-sectional view of the track cover system shown in FIG. 7 taken along line 8—8 of FIG. 7.

BEST MODES FOR CARRYING OUT THE INVENTION

Figure 1:
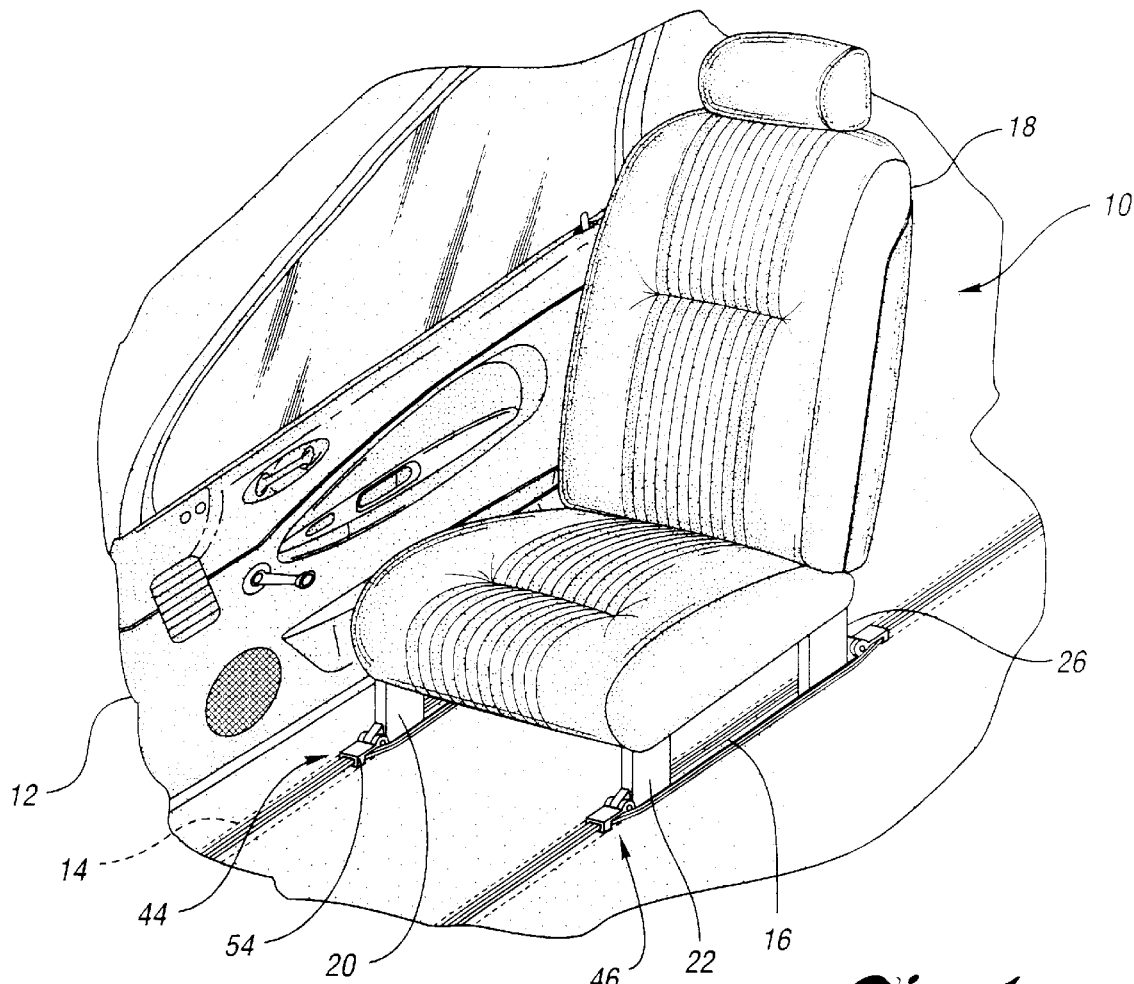
FIG. 1 is a perspective view of a seating system according to the invention and including first and second tracks, first and second track cover systems, and a seat that is moveable along the first and second tracks.
Figure 2:
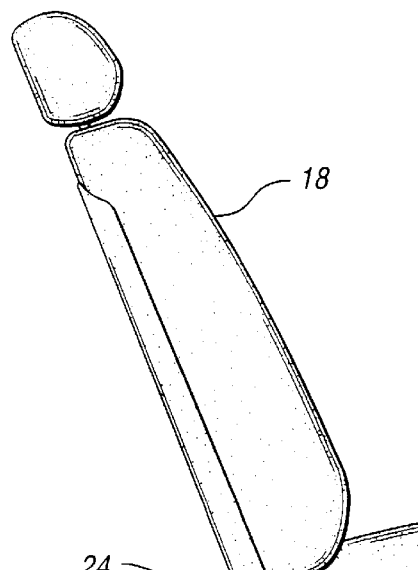
FIG. 2 is a side view of the seating system shown in FIG. 1.
Figure 2:
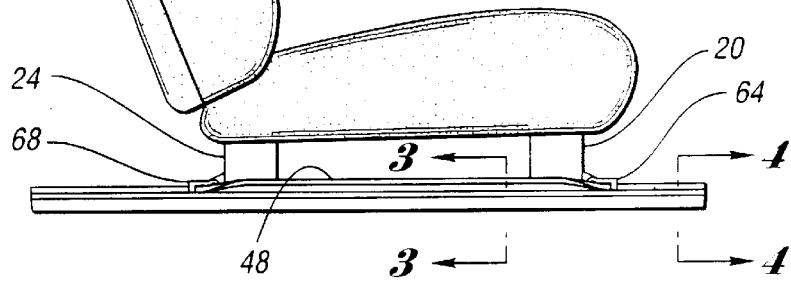

FIGS. 1 through 3 show a seating system 10 according to the invention for use with a vehicle 12. The seating system 10 includes first and second tracks 14 and 16, respectively, that are adapted to be attached to the vehicle 12 in any suitable manner. The seating system 10 further includes a seat 18 having first and second front legs 20 and 22, respectively, engaged with the tracks 14 and 16, respectively, and third and fourth rear legs 24 and 26, respectively, engaged with the tracks 14 and 16, respectively. Furthermore, the seat 18 is moveable along the tracks 14 and 16 in a first direction toward the rear of the vehicle 12, and in a second direction toward the front of the vehicle 12. It is to be understood that the seating system 10 may also include additional tracks and seats as needed for a particular application. Moreover, the seating system 10 may include multiple seats that are engaged with a single pair of tracks.

The tracks 14 and 16 are preferably similar in construction and operation. Thus, while this detailed description will focus primarily on the construction and operation of the track 14, a thorough understanding of the track 16 will be apparent therefrom. The track 14 includes a track body 28 having flange portions 30 and a track slot 32 for receiving wheels 34, or other moveable elements, of the seat 18. The flange portions 30 are preferably secured to a floor 35 of the vehicle 12 with fasteners, such as bolts 36 and nuts 38. Furthermore, the nuts 38 are preferably integrally formed as part of the floor 35. Alternatively, the track 14 may be secured to the floor 35 in any suitable manner such as by welding the flange portions 30 to the floor 35. Furthermore, the track body 28 includes first and second grooves or sockets 40 and 42, respectively. While the track body 28 may comprise any suitable material such as molded plastic, the track body 28 preferably comprises extruded aluminum.

The seating system 10 further includes first and second track cover systems 44 and 46 for the tracks 14 and 16, respectively. Because the track cover systems 44 and 46 are similar in construction and function, only the track cover system 44 associated with the track 14 will be described in detail. The track cover system 44 includes first and second cover elements, such as first and second flexible strips 48 and 50, respectively, that are preferably, but not necessarily, formed of extruded plastic. The first and second flexible strips 48 and 50, respectively, preferably have first and second beads 52 and 54, respectively, that extend substantially the entire length of the first and second flexible strips 48 and 50, respectively. The first and second beads 52 and 54, respectively, are engageable with the first and second sockets 40 and 42, respectively, of the track body 28 for securing the flexible strips 48 and 50 to the track body 28. Alternatively, the flexible strips 48 and 50 may be connected to the track body 28 in any suitable manner such as with fasteners. Thus, the flexible strips 48 and 50 may be provided as part of the track 14. Alternatively, the flexible strips 48 and 50 may be attached to another structure or element of the vehicle 12, such as a flooring system.

The first and second flexible strips 48 and 50, respectively, further have first and second enlarged ends 56 and 58, respectively, disposed opposite the first and second beads 52 and 54, respectively. The first enlarged end 56 preferably includes a third bead 60 that extends substantially the entire length of the first flexible strip 48. The second enlarged end 58 preferably has a third groove or socket 62, which extends substantially the entire length of the second flexible strip 50, for receiving the third bead 60. Furthermore, the flexible strips 48 and 50 are moveable between an open position shown in FIG. 3, and a normally closed position shown in FIG. 4 in which the third bead 60 is engaged with the third socket 62. Alternatively, the flexible strips 48 and 50 may have any suitable configuration that enables the flexible strips 48 and 50 to be interlocked together.

Referring to FIGS. 5 and 6, the track cover system 44 further includes an opening/closing device or slider 64 disposed in front of the first leg 20 and moveable along the flexible strips 48 and 50 for opening and closing the flexible strips 48 and 50. Preferably, but not necessarily, the slider 64 is pivotally attached to the first leg 20 such as with a fastener 66. While the slider 64 may be made in any suitable manner and comprise any suitable material, the slider 64 preferably comprises injection molded plastic or extruded aluminum.

When the slider 64 is moved in the first direction toward the rear of the vehicle 12, the slider 64 causes the third bead 60 to snap into or otherwise engage the third socket 62 to thereby cover at least a portion of the track slot 32 with the flexible strips 48 and 50. When the slider 64 is moved in the second direction toward the front of the vehicle 12, the slider 64 causes the third bead 60 to disengage the third socket 62 to thereby uncover the track slot 32. Thus, the slider 64 functions as a clamp at one end for drawing the flexible strips 48 and 50 together, and as a wedge at the other end for forcing the flexible strips 48 and 50 apart.

Returning to FIG. 2, the track cover system 44 may include an additional opening/closing device or slider 68 disposed behind the third leg 24, and preferably attached to the third leg 24. The slider 68 is similar to the slider 64, but is oriented in the opposite direction. Consequently, when the slider 68 is moved in the first direction toward the rear of the vehicle 12, the slider 68 causes the third bead 60 to disengage the third socket 62 to thereby uncover the track slot 32. When the slider 68 is moved in the second direction toward the front of the vehicle 12, the slider 68 causes the third bead 60 to engage the third socket 62 to thereby cover the track slot 32 with the flexible strips 48 and 50. With this arrangement, the track slot 32 remains effectively covered in front of and behind the seat 18, thereby inhibiting ingress of dust, dirt and/or moisture into the track slot 32.

Furthermore, the track cover system 44 may be provided with two more opening/closing devices or sliders (not shown), one behind the first leg 20 and preferably attached to the first leg 20, and the other in front of the third leg 24 and preferably attached to the third leg 24. With such an arrangement, coverage of the track slot 32 can be maximized.

FIGS. 7 and 8 show a second embodiment 100 of the track cover system that includes first and second cover elements, such as first and second flexible strips 102 and 104, respectively, and multiple opening/closing devices or sliders 106. The flexible strips 102 and 104 are similar to the flexible strips 48 and 50, but are attached to a vehicle flooring system such as carpet 108 having a backing layer 110. While the flexible strips 102 and 104 may be attached to the carpet 108 in any suitable manner, the flexible strips 102 and 104 are preferably adhesively attached to the backing layer 110.

The sliders 106 may be connected together with an attachment device, such as a strap 112, so that the sliders 106 may move together as the seat 18 moves. Advantageously, the strap 112 may also be easily removed from one or both of the sliders 106. With such an arrangement, the sliders 106 may be moved independently of the seat 18 in order to gain access to the track slot 32.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, the track cover system of the invention may be used with any vehicle track that receives one or more moveable elements, such as a sliding door support or a moveable handle.

What is claimed is:

1. A track cover system for use with a vehicle having a track, the system comprising:

first and second cover elements adapted to be attached to the vehicle such that the cover elements are disposed on opposite sides of the track, the cover elements being engageable with each other; and a slider slidably engageable with the cover elements for engaging the cover elements together to thereby cover at least a portion of the track.

2. The track cover system of claim 1 wherein the cover elements are adapted to be attached to the track.

3. The track cover system of claim 1 wherein the cover elements are adapted to be attached to a flooring system of the vehicle.

4. The track cover system of claim 1 further comprising a flooring system adapted to be attached to the vehicle, wherein the cover elements are attached to the flooring system.

5. The track cover system of claim 1 wherein one cover element has a bead, and the other cover element has a socket for receiving the bead.

6. The track cover system of claim 1 wherein the slider is adapted to cooperate with a moveable element received in the track so as to move with the moveable element.

7. The track cover system of claim 1 wherein the slider is adapted to be attached to a moveable element received in the track.

8. The track cover system of claim 1 wherein the slider is adapted to be attached to a leg of a moveable vehicle seat.

9. A track cover system for use with a vehicle having a track, the system comprising:

first and second flexible strips adapted to be attached to the vehicle such that the strips are disposed on opposite sides of the track, one strip having a bead and the other strip having a socket for receiving the bead; and a slider slidably engageable with the strips, wherein movement of the slider in one direction causes the bead to engage the socket so that the strips cover a portion of the track, and movement of the slider in the opposite direction causes the bead to disengage the socket to thereby expose the portion of the track.

10. A seating system for use with a vehicle, the system comprising:

first and second tracks adapted to be attached to the vehicle, each of the tracks including a track body having a track slot, and first and second cover elements attached on opposite sides of the track body, the cover elements of each track being engageable with each other;

a seat having first and second legs that are moveable a long the first and second tracks, respectively, and first and second sliders disposed proximate the first and second legs, respectively, and slidably engageable with the cover elements of the first and second tracks, respectively, wherein movement of the sliders in a first direction causes the cover elements of each track to engage each other and thereby cover a portion of each track slot, and movement of the sliders in a second direction opposite the first direction causes the cover elements of each track to disengage and thereby uncover the portion of each track slot.

11. The seating system of claim 10 wherein one track body has one of the group consisting of a bead and a socket, and one cover element has the other of the group consisting of the bead and the socket for attaching the one cover element to the one track body.

12. The seating system of claim 10 wherein each cover element has a bead, and each track body has first and second sockets, each of the sockets being configured to receive a respective bead.

13. The seating system of claim 10 wherein each first cover element has a bead, and each second cover element has a socket for receiving a respective bead.

14. The seating system of claim 10 wherein the first and second sliders are attached to the first and second legs respectively.

15. The seating system of claim 10 wherein the first and second sliders are disposed in front of the first and second legs, respectively, and the system further comprises third and fourth sliders disposed behind the first and second legs, respectively, and slidably engageable with the cover elements of the first and second tracks, respectively, wherein movement of the third and fourth sliders in the first direction causes the cover elements of each track to disengage, and movement of the third and fourth sliders in the second direction causes the cover elements of each track to engage each other.

16. The seating system of claim 15 wherein the first and third sliders are attached to the first leg, and the second and third sliders are attached to the second leg.

17. The seating system of claim 15 wherein the seat further includes third and fourth legs that are moveable along the first and second tracks, respectively, the first and second sliders being attached to the first and second legs, respectively, and the third and fourth sliders being attached to the third and fourth legs, respectively.

18. The seating system of claim 15 further comprising a first attachment member for joining together the first and third sliders, and a second attachment member for joining together the second and fourth sliders.

* * * * *

UNITED STATES PATENT AND TRADEMARK OFFICE
CERTIFICATE OF CORRECTION

| | |
|---|---|
| PATENT NO. | : 6,145,911 |
| DATED | : November 14, 2000 |
| INVENTOR(S) | : Alan Sturt |

It is certified that error appears in the above-identified patent and that said Letters Patent is hereby corrected as shown below:

<u>Column 5, Claim 10,</u>
Lines 33 and 34, "a long" should be --along--.

Signed and Sealed this

Tenth Day of July, 2001

*Attest:*

NICHOLAS P. GODICI
*Attesting Officer*    *Acting Director of the United States Patent and Trademark Office*